(12) United States Patent
Nishiyama

(10) Patent No.: US 7,831,355 B2
(45) Date of Patent: Nov. 9, 2010

(54) ELECTRIC POWER STEERING APPARATUS

(75) Inventor: Akihiro Nishiyama, Okazaki (JP)

(73) Assignee: JTEKT Corporation, Osaka (JP)

( * ) Notice: Subject to any disclaimer, the term of this patent is extended or adjusted under 35 U.S.C. 154(b) by 875 days.

(21) Appl. No.: 11/649,372

(22) Filed: Jan. 4, 2007

(65) Prior Publication Data

US 2007/0168094 A1    Jul. 19, 2007

(30) Foreign Application Priority Data

Jan. 12, 2006    (JP) .............................. 2006-005314

(51) Int. Cl.
*A01B 69/00*    (2006.01)
(52) U.S. Cl. ............................ 701/41; 701/42; 180/443; 180/446; 180/410; 180/434; 700/41; 700/42; 700/44; 700/45; 340/465
(58) Field of Classification Search ................... 701/41, 701/42; 180/443, 410, 446, 434, 417; 340/465; 700/441, 42, 44, 45

See application file for complete search history.

(56) References Cited

U.S. PATENT DOCUMENTS

| 6,445,987 | B1 * | 9/2002 | Kurishige et al. ............. 701/41 |
| 6,999,862 | B2 * | 2/2006 | Tamaizumi et al. ............ 701/41 |
| 2002/0125063 | A1 | 9/2002 | Kurishige et al. | |
| 2006/0041358 | A1 * | 2/2006 | Hara ............................ 701/41 |
| 2007/0168094 | A1 * | 7/2007 | Nishiyama ................... 701/41 |

FOREIGN PATENT DOCUMENTS

| EP | 1291262 | A2 |   | 3/2003 |
| EP | 1564109 | A2 |   | 8/2005 |
| JP | 2003-081102 |   |   | 3/2003 |
| JP | 2004217085 | A | * | 8/2004 |
| JP | 2004291815 |   | * | 10/2004 |
| WO | WO-2005/108186 | A1 |   | 11/2005 |

* cited by examiner

*Primary Examiner*—Tuan C To
*Assistant Examiner*—Redhwan Mawari
(74) *Attorney, Agent, or Firm*—Rabin & Berdo, P.C.

(57) ABSTRACT

An electric power steering apparatus includes a driving target value setting unit for setting a driving target value of an electric motor; a steering acceleration detecting unit for detecting or estimating a steering acceleration; a correction amount computing unit for computing a control correction amount in accordance with the steering acceleration; a vehicle acceleration detecting unit for detecting an acceleration of a motor vehicle; an acceleration adaptive gain setting unit for setting a gain in accordance with an acceleration of a motor vehicle; a multiplication unit for determining a gain adjusted control correction amount by multiplying the control correction amount with the acceleration adaptive gain; a correcting unit for correcting the driving target value on the basis of the gain adjusted control correction amount; and motor driving units for driving the electric motor on the basis of the corrected driving target value.

6 Claims, 3 Drawing Sheets

ELECTRIC POWER STEERING APPARATUS

BACKGROUND OF THE INVENTION

1. Field of the Invention

The present invention relates to an electric power steering apparatus which assists a steering force by transmitting a driving force of an electric motor to a steering mechanism.

2. Description of Related Art

Conventionally, an electric power steering apparatus has been used as an equipment for a motor vehicle. Such an electric power steering apparatus is configured to assist a steering effort by transmitting, to a steering mechanism, a torque produced at an electric motor that is driven in accordance with a steering torque applied to a steering wheel (Japanese Unexamined Patent Publication No. 2003-081102, for example).

In sudden braking of the motor vehicle, a brake pad strongly presses against a disk rotor and generates a great vibration onto vehicle wheels. The vibration is transmitted to a steering wheel through a steering mechanism and vibrates the steering wheel, adversely affecting the steering feeling. There is a need to improve this drawback.

SUMMARY OF THE INVENTION

It is an object of the present invention to provide an electric power steering apparatus which can improve the steering feeling at the time of braking of the motor vehicle.

The electric power steering apparatus of the present invention for performing steering assist by transmitting a driving force of an electric motor to a steering mechanism comprises: a driving target value setting unit for setting a driving target value of the electric motor; a steering acceleration detecting unit for detecting or estimating a steering acceleration; a correction amount computing unit for computing a control correction amount in accordance with the steering acceleration detected or estimated by the steering acceleration detecting unit; a vehicle acceleration detecting unit for detecting an acceleration of a motor vehicle equipped with the electric power steering apparatus; an acceleration adaptive gain setting unit for setting a gain in accordance with an acceleration detected by the vehicle acceleration detecting unit; a multiplication unit for obtaining a gain adjusted control correction amount by multiplying a control correction amount computed by the correction amount computing unit with a gain set by the acceleration adaptive gain setting unit; a correcting unit for correcting the driving target value on the basis of the gain adjusted control correction amount determined by the multiplication unit; and a motor driving unit for driving the electric motor on the basis of the driving target value corrected by the correcting unit.

In an electric power steering apparatus, the torque applied to an operation member for steering a motor vehicle is transmitted through a steering mechanism to a vehicle wheel, and at the same time, the driving force produced by an electric motor is transmitted to the steering mechanism. On the other hand, the inverted input from a steerable vehicle wheel is transmitted to the operation member such as a steering wheel through the steering mechanism and also to the electric motor. At this time, the steering acceleration shows an inverted input from the steerable vehicle wheel. For this reason, controlling the driving of the electric motor depending on the the steering acceleration can reduce or prevent an undesirable vibration at the time of braking.

Accordingly, in the present invention, a steering acceleration is detected or estimated by a steering acceleration detecting unit. Further, the vehicle acceleration detecting unit detects the acceleration of the motor vehicle as an amount in association with the braking state of the motor vehicle. The control correction amount depending on the steering acceleration is then determined and the determined amount is multiplied by the gain depending on the acceleration of the motor vehicle in order to determine a gain adjusted control correction amount. In other words, the gain adjusted control correction amount can be an amount to reduce or cancel the inverted input from the steerable vehicle wheel depending on the braking state of a vehicle. The gain adjusted control correction amount is used for correcting the driving target value, and the electric motor is driven and controlled on the basis of the corrected driving target value. As a result, a compensation control can be performd on the electric motor depending on the steering acceleration and the acceleration of the motor vehicle, and accordingly, the vibration caused by the inverted input from the steerable vehicle wheel can be effectively reduced depending on the braking state of the motor vehicle and the steering feeling can be improved.

It is preferred that the correction amount computing unit computes the control correction amount for reducing or cancelling the steering acceleration detected or estimated by the steering acceleration detecting unit. In this configuration, the control correction amount is computed to reduce or cancel the steering acceleration and thus can effectively reduce or cancel the vibration caused by the inverted input from the steerable vehicle wheel.

It is preferred that the acceleration adaptive gain setting unit sets a significant gain only if the acceleration detected by the motor vehicle acceleration detecting unit shows a decelerated movement. More specifically, it is preferred that the acceleration adaptive gain setting unit sets the gain to zero when the vehicle acceleration is not less than zero. By this configuration, the vehicle can transmit the input from the road surface to the operation member when running at a fixed speed or at an accelerated speed, and at the same time, the vehicle can reduce an undesired vibration caused by the inverted input from the steerable vehicle wheel at the time of deceleration (braking).

It is preferred that the acceleration adaptive gain setting unit sets a greater gain as the acceleration detected by the motor vehicle acceleration detecting unit shows a greater decelerated movement. More specifically, it is preferred that the acceleration adaptive gain setting unit sets a greater gain within a range not less than a predetermined upper limit when the motor vehicle acceleration is a negative value and the absolute value is greater.

By this configuration, the deceleration of the motor vehicle becomes greater, that is, the deceleration becomes in a more rapid state, the correction of the steering acceleration on the basis of the driving target value can be performed more strongly. Accordingly, an appropriate compensation control depending on the braking state of the motor vehicle can be performed, in which the the state of the road surface can be transmitted appropriately to the operation member and at the same time the vibration of the operation member during hard braking can be reduced.

It is preferred that the electric power steering apparatus further comprises a straight traveling judging unit for judging whether or not the motor vehicle is traveling straight ahead; and a correction controlling unit for permitting a correction of the driving target value by the correction unit under a condition that the straight traveling judging unit judges that the motor vehicle is traveling straight ahead or for prohibiting a correction of the driving target value by the correction unit when it is not judged the motor vehicle is traveling straight ahead. In this configuration, the correction of the driving target value depending on the steering acceleration can be performed only if the motor vehicle is traveling straight ahead. Typically, the motor vehicle is running straight ahead when the brake is suddenly applied. Therefore, the configuration described above can effectively reduce an undesired vibration of the operation member during hard braking.

The electric power steering apparatus may further comprise a steering torque detecting unit for detecting a steering torque applied on an operation member for steering a motor vehicle; and a steering speed detecting unit for detecting a steering speed. In this case, the straight traveling judging unit comprises a steering torque judging unit for judging whether or not the size of a steering torque detected by the steering torque detecting unit is less than a predetermined torque threshold value; and a steering speed judging unit for judging whether or not the size of a steering speed detected by the steering speed detecting unit is less than a predetermined speed threshold value, wherein the straight traveling judging unit may judge that the vehicle is traveling straight ahead when the size of the steering torque is less than the torque threshold value and at the same time the steering speed is less than the speed threshold value. By this configuration, it is precisely judged whether or not the motor vehicle travels straight ahead on the basis of the size of the steering torque and the steering speed.

The steering speed detecting unit may detect the rotation speed of the electric motor as a steering speed. In this case, the steering acceleration detecting unit may determine the rotation acceleration by differentiation of the rotation speed of the electric motor, and detect the rotation acceleration as the steering acceleration.

These and other objects, features and effects of the present invention will become more apparent from the description of the following embodiment with reference to the attached drawings.

DETAILED DESCRIPTION OF PREFERRED EMBODIMENTS

Figure 1:
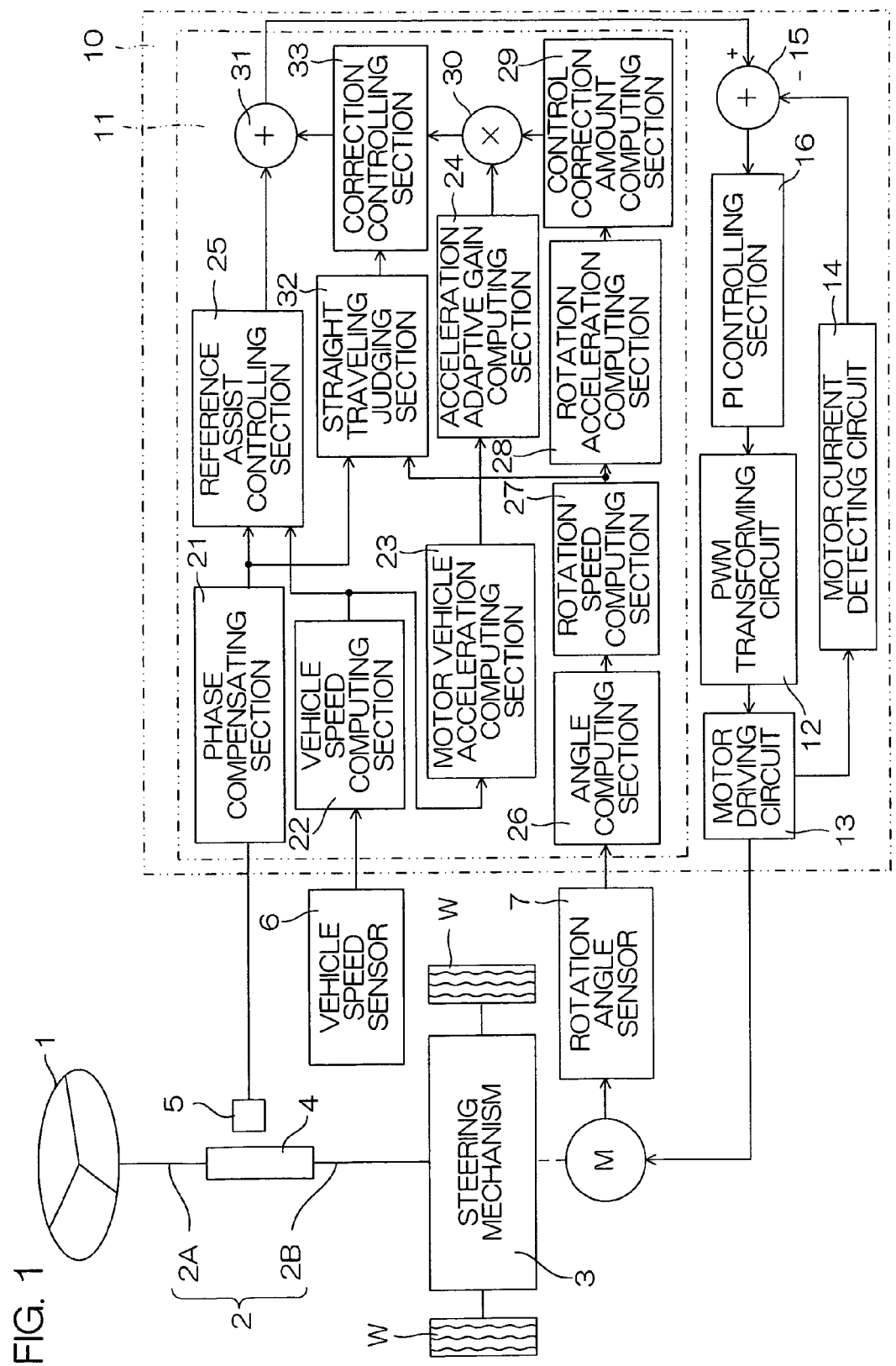
FIG. 1 is a block diagram showing an electrical configuration of an electric power steering apparatus according to an embodiment of the present invention.

FIG. 1 is a block diagram showing an electrical configuration of an electric power steering apparatus according to an embodiment of the present invention. A steering torque applied to a steering wheel 1 serving as an operation member is mechanically transmitted to a steering mechanism 3 through a steering shaft 2. A steering assist force is transmitted to the steering mechanism 3 from an electric motor M through reduction mechanism (not shown) or by a direct drive system. The steering mechanism steers a steerable vehicle wheel W by receiving the torques from the steering shaft 2 and the electric motor M.

The steering shaft 2 is divided into an input shaft 2A coupled to the steering wheel 1 and an output shaft 2B coupled to the steering mechanism 3. The input shaft 2A and the output shaft 2B are connected to each other by a torsion bar 4. The torsion bar 4 causes distortion depending on the steering torque. The direction and the amount of the distortion are detected by a torque sensor 5 (steering torque detecting unit). The output signal of the torque sensor 5 is inputted to the controller 10 (ECU: Electronic Control Unit).

The controller 10 is inputted not only with the signal outputted from the torque sensor 5, but also with the vehicle speed signal outputted from the vehicle speed sensor 6, and with the rotation angle signal outputted from the rotation angle sensor 7 for detecting the rotation angle of the electric motor M. In the case where the electric motor M is a brushless motor, for example, the rotation angle sensor 7 can be a resolver for detecting the rotation angle.

The controller 10 determines an electric current command value as a motor driving value depending on a steering torque detected by the torque sensor 5 and a vehicle speed detected by the vehicle speed sensor 6, and the like, in order to drive and control the electric motor M such that a steering assist force in accordance with the steering torque and the vehicle speed is applied to the steering mechanism 3.

The controller 10 comprises a microcomputer 11, a PWM (Pulse Width Modulation) transforming circuit 12, a motor driving circuit 13, a motor current detecting circuit 14 for detecting a current flowing through the electric motor M, and a deviation calculating circuit 15. The microcomputer 11 computes an electric current command value on the basis of a steering torque detected by the torque sensor 5 and a vehicle speed detected by the vehicle speed sensor 6 and provides the obtained value to the deviation calculating circuit 15. The deviation calculating circuit 15 determines a deviation between the motor current value detected by the motor current detecting circuit 14 and the electric current command value, and then inputs the obtained deviation to a PI (proportional integral) controlling section 16 and provides the output to a PWM transforming circuit 12. The PWM transforming circuit 12 produces a PWM drive signal which has a duty ratio corresponding to the deviation determined by the deviation calculating circuit 15 and input the signal to the motor driving circuit 13. The motor driving circuit 13 supplies the current corresponding to the PWM drive signal to the electric motor M. The driving force produced by the electric motor M is thus transmitted to the steering mechanism 3 as a steering assist force.

The microcomputer 11 comprises a CPU (Central Processing Unit) and a memory, and executes a predetermined program to function as a plurality of functional processing units. The plurality of functional processing units comprises a phase compensating section 21 which performs a phase compensating process with respect to the output signal of the torque sensor 5 and produces a phase compensated steering torque value; a vehicle speed computing section 22 for computing the vehicle speed value of the motor vehicle equipped with the electric power steering apparatus on the basis of a vehicle speed signal outputted by the vehicle speed sensor 6; a motor vehicle acceleration computing section 23 (motor vehicle acceleration detecting unit) for computing the acceleration of the motor vehicle by subjecting the obtained vehicle speed value to time differential; a reference assist controlling section 25 (driving target value setting unit) for obtaining a target current value as a driving target value on the basis of the steering torque value and the vehicle speed value; and an acceleration adaptive gain computing section 24 (acceleration adaptive gain setting unit) for setting a gain (acceleration adaptive gain) corresponding to the motor vehicle acceleration. The plurality of functional processing units further comprises an angle computing section 26 for obtaining a rotation angle of the electric motor M on the basis of the output of the rotation angle sensor 7; a rotation speed computing section 27 (steering speed detecting unit) for computing the rotation speed of the electric motor M by obtaining the time-based differential value of the obtained rotation angle; a rotation acceleration computing section 28 (steering acceleration detecting unit) for obtaining a rotation acceleration of the electric motor M by further time-based differentiation of the rotation speed of the electric motor M; a control correction amount computing section 29 (correction amount computing unit) for computing the amount of the control correction corresponding to the obtained rotation acceleration; and a multiplication section 30 (multiplication unit) for multiplying the obtained control correction amount by acceleration adaptive gain obtained by acceleration adaptive gain computing section 24. The plurality of functional processing units further comprises a correction section 31 (correction unit) for correcting a target current value by adding the gain adjusted control correction amount produced by the multiplication unit 30 to the target current value; a straight traveling judging section 32 (straight traveling judging unit) for judging whether or not the motor vehicle travels straight ahead; and a correction controlling section 33 (correction controlling unit) for switching whether or not the correction of the target current value is to be performed by the gain adjusted control correction amount produced by the multiplication unit 30 on the basis of the result judged by the straight traveling judging section 32.

The reference assist controlling section 25 sets the target current value in accordance with the reference assist characteristics (assist map) which set the target current value corresponding to the steering torque value and the vehicle speed value. In other words, the target current value is obtained by applying the steering torque value which is phase-compensated by the phase compensating section 21 and the vehicle speed obtained by the vehicle speed computing section 22 to the reference assist map. The target current value is corrected at the correction section 31 and the corrected target current value is provided to the deviation calculating circuit 15 as an electric current command value.

The steering torque takes a positive value with respect to the steering torque in a rightward steering direction, and takes a negative value with respect to the steering torque in a leftward steering direction. In accordance with this, for example, the target current value is made to take a positive value in the case where a rightward steering assist force should be applied to the steering mechanism 3, and the target current value is made to take a negative value in the case where a leftward steering assist force should be applied to the steering mechanism 3. In accordance with this, the rotation speed and the rotation acceleration of the electric motor M corresponding to the rightward steering will be shown in a positive value and the rotation speed and the rotation acceleration of the electric motor M corresponding to the leftward steering will be shown in a negative value in the description hereinbelow.

In addition, the motor vehicle acceleration obtained by the motor vehicle acceleration computing section 23 will be a positive value at the time of acceleration and a negative value at the time of deceleration. An acceleration value with an inversed sign will be referred to as a "deceleration" when necessary.

The straight traveling judging section 32 judges whether or not the motor vehicle equipped with the electric power steering apparatus of the present invention is traveling straight ahead on the basis of the steering torque value which is phase-compensated by the phase compensating section 21 and the rotation speed obtained by the rotation speed computing section 27. The straight traveling judging section 32 judges that the motor vehicle is traveling straight ahead when the absolute value of the steering torque value is less than a predetermined torque threshold value (2 Nm, for example) and at the same time the absolute value of the rotation speed of the electric motor M is less than a predetermined rotation speed threshold value (2000 deg/sec, for example), and judges that the motor vehicle is not traveling straight ahead when any one of these conditions are not satisfied.

When the motor vehicle is judged that it is traveling straight ahead, the correction controlling section 33 provides the gain adjusted control correction amount from the multiplication unit 30 to the correction section 31. On the other hand, when the motor vehicle is judged that it is not traveling straight ahead, the correction controlling section 33 does not provide the gain adjusted control correction amount to the correction section 31. In other words, in the case where the motor vehicle is not traveling straight ahead, the correction controlling section 33 sets the control correction amount to zero.

Figure 2:
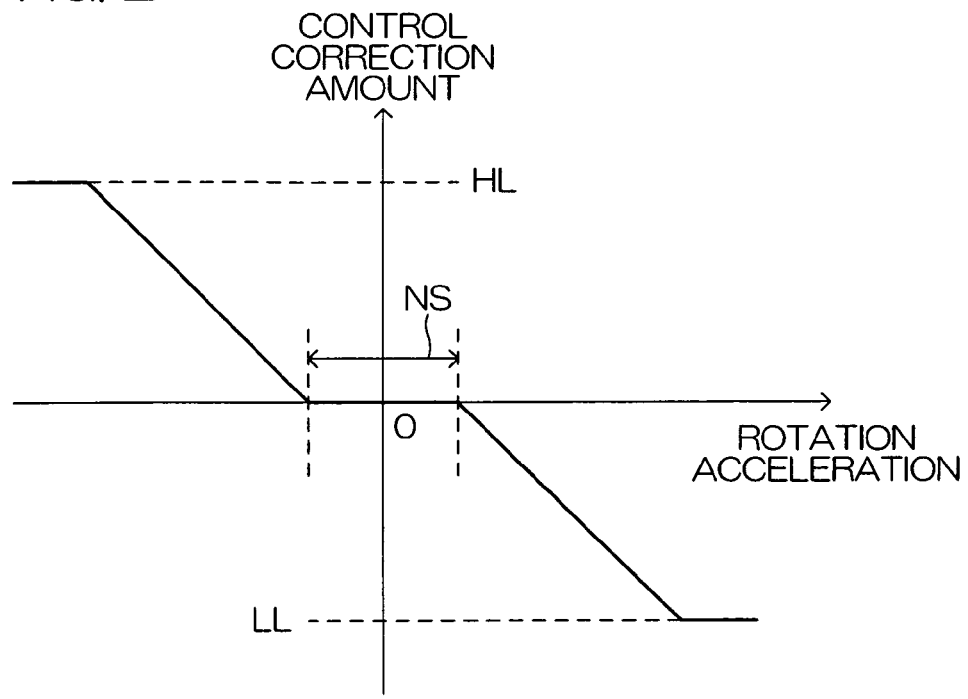
FIG. 2 is a diagram for describing the function of a control correction amount computing unit.

FIG. 2 is a diagram for describing the function of the control correction amount computing unit 29. FIG. 2 shows a relationship of the control correction amount with respect to the rotation acceleration computed by the rotation acceleration computing section 28. The control correction amount computing unit 29 can be configured by the control correction amount map shown in FIG. 2.

The control correction amount is variably set between a predetermined lower-limit value LL (<0) and a predetermined upper-limit value HL (>0). More specifically, when the rotation acceleration is in a region of the negative value (a region of leftward steering direction), the control correction amount is set at a value of zero or more, and when the rotation acceleration is in a region of the positive value (rightward steering direction), the control correction amount is set at a value of zero or less. More specifically, the control correction amount is set at zero when the rotation acceleration is in a range of a predetermined dead zone NS in the vicinity of zero. On the other hand, in the case where the rotation acceleration is out of a range of the dead zone NS, as the rotation acceleration increases, the control correction amount decreases and changes linearly. The control correction amount is therefore made to have a sign which reduces or cancels the rotation acceleration and is set to have a larger absolute value accordingly as the rotation acceleration have a larger absolute value.

Figure 3:
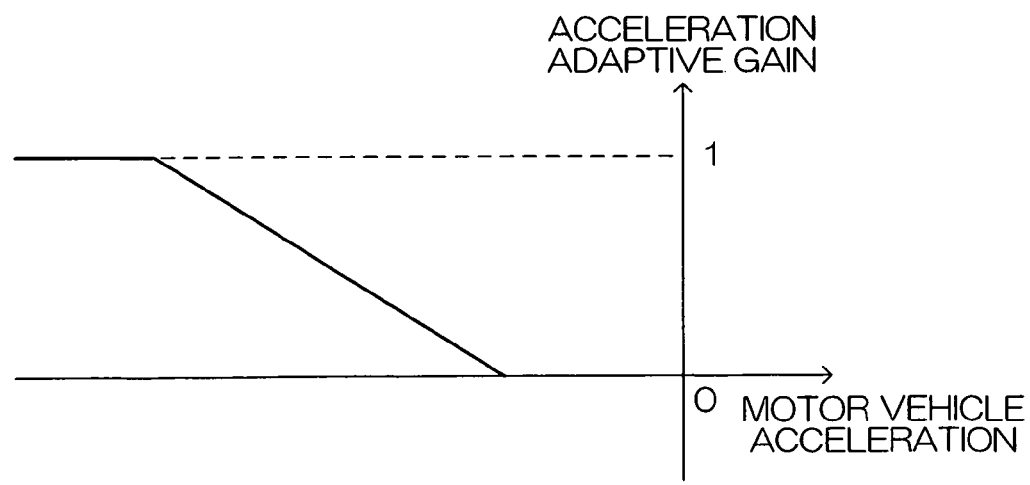
FIG. 3 is a diagram for describing the operation of an acceleration adaptive gain computing section.

FIG. 3 is a diagram for describing the operation of the acceleration adaptive gain computing section 24. FIG. 3 shows a relationship of the acceleration adaptive gain with respect to the motor vehicle acceleration. The acceleration adaptive gain computing section 24 can be configured by an acceleration adaptive gain map that stores the characteristics shown in FIG. 3.

The acceleration adaptive gain is kept at zero when the motor vehicle acceleration is in a region of zero or more, and is variably set within a range of zero to one when the motor vehicle acceleration is in a negative region. More specifically, the acceleration adaptive gain is kept at zero within the predetermined dead zone range in the vicinity of zero even when the motor vehicle acceleration is in a negative region. The acceleration adaptive gain is set to show a linear change with respect to the motor vehicle acceleration outside of the dead zone range in a way that the smaller the motor vehicle acceleration becomes, the greater the acceleration adaptive gain becomes. In this manner, the acceleration adaptive gain is kept at zero when the motor vehicle is running at a constant speed or is being accelerated, and on the other hand, a greater acceleration adaptive gain is set accordingly as the decelerated movement is greater when the motor vehicle is being decelerated (when the motor vehicle acceleration is a negative value and as the absolute value is greater). A larger acceleration adaptive gain is thus set during hard braking of the motor vehicle.

At the time of braking, a braking device of the motor vehicle presses against a rotor disk and a vibration is produced on the wheel. The vibration is transmitted through a steering mechanism 3 and a steering shaft 2 to the steering wheel 1. The vibration becomes an inverted input to the electric motor M, which causes a rotation of the rotor in the electric motor M. The rotation acceleration produced at this time is detected by the function of a rotation acceleration computing section 28 and the like. A control correction amount computing unit 29 produces a control correction amount for reducing or cancelling such rotation acceleration. The control correction amount is multiplied by the acceleration adaptive gain obtained by the acceleration adaptive gain computing section 24, making the gain adjusted control correction amount to take zero when the motor vehicle is running at a constant speed or is being accelerated, and to take a value corresponding to the deceleration at the time of decelerated movement (a braking state, in particular).

Such gain adjusted control correction amount is added to the target current value at a correction section 31 and allows the electric motor M to be driven in such a way that it reduces or cancels the vibration caused by the inverted input from the steerable vehicle wheel W. That is, at the time of decelerated movement of the motor vehicle, the electric motor M acts to have a greater apparent inertia, and reduces the vibration caused by the inverted input from the steerable vehicle wheel W to be transmitted through the steering shaft 2 to the steering wheel 1. In other words, the electric motor M acts to damp the inverted input from the steerable vehicle wheel W. As a result, the vibration of the steering wheel 1 is reduced during hard braking and the steering feeling can be significantly improved.

Figure 4:
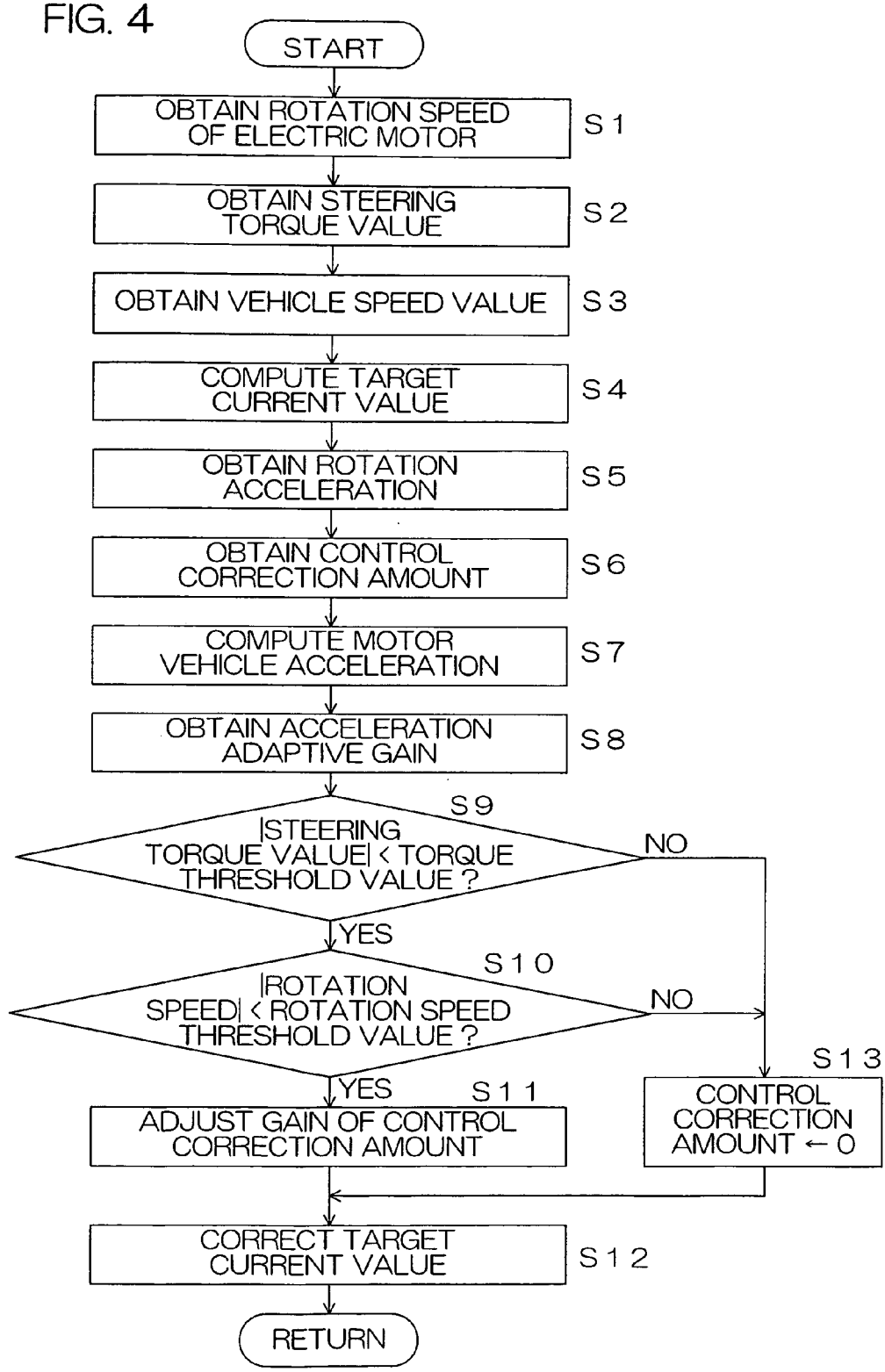
FIG. 4 is a flow chart for describing the operation of a microcomputer, which is repeatedly executed for each of the predetermined control cycles.

FIG. 4 is a flow chart for describing the operation of the microcomputer 11 which is repeatedly executed for each of the predetermined control cycles. First, the angle computing section 26 and the rotation speed computing section 27 act to obtain the rotation speed $\omega$ of the electric motor M on the basis of the output from the rotation angle sensor 7 (Step S1). On the other hand, the output signal of the torque sensor 5 is read and a phase compensated steering torque value is obtained by the phase compensating section 21 (Step S2). Then the output signal of the vehicle speed sensor 6 is read and a vehicle speed value V is obtained by the vehicle speed computing section 22 (Step S3). The reference assist controlling section 25 computes a target current value according to the reference assist map on the basis of the steering torque value and the vehicle speed value V (Step S4).

On the other hand, the rotation acceleration computing section 28 obtains a rotation acceleration $\omega'$ by differentiation of the rotation speed $\omega$ obtained by the rotation speed computing section 27 (Step S5). On the basis of the rotation acceleration $\omega'$, a control correction amount is obtained by the control correction amount computing unit 29 (Step S6). The motor vehicle acceleration computing section 23 computes the motor vehicle acceleration V' by performing time-based differentiation of the vehicle speed value V (Step S7). On the basis of the computed motor vehicle acceleration V', the acceleration adaptive gain is obtained by the acceleration adaptive gain computing section 24 (Step S8).

The straight traveling judging section 32 compares the absolute value of the steering torque value and the predetermined torque threshold value (Step S9: A function as a steering torque judging unit), and the straight traveling judging section 32 further compares the absolute value of the rotation speed obtained by the rotation speed computing section 27 and the predetermined rotation speed threshold value (Step S10.: A function as a steering speed judging unit). When the absolute value of the steering torque is less than the torque threshold value (Step S9:YES) and at the same time the absolute value of the rotation speed of the electric motor M is less than the rotation speed threshold value (Step S10:YES), the motor vehicle is judged as being traveling straight ahead. In this case, the correction controlling section 33 provides the gain adjusted control correction amount (=control correction amount×acceleration adaptive gain) obtained by the multiplication unit 30 to the correction section 31 (Step S11). Thus, the gain adjusted control correction amount is added to the target current value at the correction section 31. Accordingly, the corrected target current value is obtained as the electric current command value (Step S12). On the other hand, when the absolute value of the steering torque value is not less than the torque threshold value (Step S9: NO) or when the rotation speed of the electric motor M is not less than the rotation speed threshold value (Step S10: NO), the motor vehicle is judged as not being traveling straight ahead and the correction controlling section 33 sets the control correction amount which should be provided to the correction section 31 to zero (Step S13). That is to say, in this case, the target current value set by the reference assist controlling section 25 is used as an electric current command value to drive and control the electric motor M (Step S12).

In this manner, in this embodiment, the control correction amount corresponding to the rotation acceleration of the electric motor M and the deceleration of the motor vehicle is added to the target current value at the time of decelerated movement of the motor vehicle under a condition that the motor vehicle is traveling straight ahead. Thus, the corrected target current value is set as the current command value. On the basis of such current command value, the motor M is driven and it can thus be reduced that the vibration caused by the inverted input from the steerable vehicle wheel W at the time of braking the motor vehicle is transmitted through the steering shaft 2 to the steering wheel 1. That is, the electric motor M can have a larger apparent inertia at the time of braking the motor vehicle, and thus the vibration of the steering wheel 1 can be reduced during hard braking and the steering feeling can be significantly improved.

On the other hand, since the control correction amount is made zero when the vehicle is not traveling straight ahead, the inverted input which is transmitted from the road surface through the steerable vehicle wheel W at the time of normal braking is transmitted through the steering shaft 2 to the steering wheel 1. When the motor vehicle is driving at a constant speed or, increasing the speed and slowly decreasing the speed, the acceleration adaptive gain is made zero, and as a result, the inverted input transmitted from the road surface is also transmitted to the steering wheel 1. In this manner, the road conditions can be appropriately transmitted through the steering wheel 1 to the driver during normal traveling.

Hereinabove, an embodiment of the present invention has been described; however, other embodiments can be implemented in this invention. For example, although in the aforementioned embodiment the rotation speed of the electric motor M is used to judge whether or not the motor vehicle is traveling straight ahead in order to determine the control correction amount corresponding to the rotation acceleration of the electric motor M, the configuration may be such that a steering angle sensor is provided for detecting the rotation angle of the steering wheel 1 in order to determine the rotation speed (steering speed) and the rotation acceleration (steering acceleration) of the steering wheel 1 and to judge depending on the rotation speed whether or not the motor vehicle is traveling straight ahead, and at the same time, to compute the control correction amount corresponding to the rotation acceleration. Since the electric power steering apparatus mechanically connects the steering wheel 1, the steering shaft 2, the steering mechanism 3 and the electric motor M, the detection of the rotation of the electric motor M is roughly equivalent to the detection of the rotation of the steering wheel 1 or the steering shaft 2, and for this reason, the rotation information of the electric motor M or the steering shaft 2 can be used as a rotation information of the steering wheel 1.

Although the vehicle speed value V is subject to time-based differential to determine the motor vehicle acceleration V' in the aforementioned embodiment, an acceleration sensor which directly detects the acceleration of the motor vehicle may be used to detect the motor vehicle acceleration.

Further, although the target current value is corrected on the basis of the gain adjusted control correction amount under a condition that the motor vehicle is traveling straight ahead in the aforementioned embodiment, such correction may be performed irrespective of whether or not the motor vehicle is traveling straight ahead.

Although the present invention has been described and illustrated in detail, it should be clearly noted that the same is by way of illustration and example only and is not to be taken by way of limitation, the spirit and scope of the present invention being limited only by the terms of the appended claims.

The present application corresponds to Japanese Patent application NO. 2006-5314 filed with the Japanese Patent Office on Jan. 12, 2006, the disclosure of which is incorporated herein by reference.

What is claimed is:

1. An electric power steering apparatus for performing steering assist by transmitting a driving force produced by an electric motor to a steering mechanism, comprising:
   a driving target value setting unit for setting a driving target value of the electric motor;
   a steering acceleration detecting unit for detecting or estimating a steering acceleration;
   a correction amount computing unit for computing a control correction amount in accordance with the steering acceleration detected or estimated by the steering acceleration detecting unit;
   a vehicle acceleration detecting unit for detecting an acceleration of a motor vehicle equipped with the electric power steering apparatus;
   an acceleration adaptive gain setting unit for setting a gain in accordance with an acceleration detected by the vehicle acceleration detecting unit;
   a multiplication unit for determining a gain adjusted control correction amount by multiplying the control correction amount computed by the correction amount computing unit with a gain set by the acceleration adaptive gain setting unit;
   a correcting unit for correcting the driving target value on the basis of the gain adjusted control correction amount determined by the multiplication unit; and
   a motor driving unit for driving the electric motor on the basis of the driving target value corrected by the correcting unit.

2. The electric power steering apparatus according to claim 1, wherein the correction amount computing unit computes a control correction amount for reducing or canceling the steering acceleration detected or estimated by the steering acceleration detecting unit.

3. The electric power steering apparatus according to claim 1, wherein the acceleration adaptive gain setting unit sets a significant gain only if the acceleration detected by the motor vehicle acceleration detecting unit shows a decelerated movement.

4. The electric power steering apparatus according to claim 1, wherein the acceleration adaptive gain setting unit sets a greater gain as the acceleration detected by the motor vehicle acceleration detecting unit shows a greater decelerated movement.

5. The electric power steering apparatus according to claim 1, further comprising:
   a straight traveling judging unit for judging whether or not the motor vehicle is traveling straight ahead; and
   a correction controlling unit for permitting correction of the driving target value by the correction unit under a condition that the straight traveling judging unit judges that the motor vehicle is traveling straight ahead, and for prohibiting correction of the driving target value by the correction unit under the condition that the straight traveling judging section judges that the motor vehicle is not traveling straight ahead.

6. The electric power steering apparatus according to claim 5, further comprising:
   a steering torque detecting unit for detecting a steering torque applied on an operation member for steering a motor vehicle; and
   a steering speed detecting unit for detecting a steering speed,
   wherein the straight traveling judging unit includes a steering torque judging unit for judging whether or not the size of a steering torque detected by the steering torque detecting unit is less than a predetermined torque threshold value, and a steering speed judging unit for judging whether or not the size of a steering speed detected by the steering speed detecting unit is less than a predetermined speed threshold value, and the straight traveling judging unit judges that the vehicle is traveling straight ahead when the size of the steering torque is less than the torque threshold value and at the same time the steering speed is less than the speed threshold value.

* * * * *